UNITED STATES PATENT OFFICE.

HENRY M. HOWE, OF BOSTON, MASSACHUSETTS, AND JOHN EDWARD STEAD, OF MIDDLESBOROUGH, ENGLAND.

PROCESS OF MAKING TETRABASIC PHOSPHATES.

SPECIFICATION forming part of Letters Patent No. 535,204, dated March 5, 1895.

Application filed February 26, 1891. Serial No. 383,008. (No specimens.)

*To all whom it may concern:*

Be it known that we, HENRY M. HOWE, of Boston, county of Suffolk, State of Massachusetts, and JOHN EDWARD STEAD, of Middlesborough, county of York, England, have invented an Improvement in Methods of Forming Soluble Phosphates, of which the following description is a specification.

This invention has for its object the conversion, by heat, of the phosphoric acid of mineral and other phosphates into a more soluble form, whereby they are rendered more available for manure and can be utilized, preferably in a comminuted or powdered form, as a fertilizer without further treatment.

Phosphoric acid in the original or natural phosphates is with difficulty soluble in water and the other solvents which exist in the soil, and in order to render it more readily soluble in and by these solvents and thus applicable for manure, it has heretofore been necessary to treat it in a very expensive way with chemicals, such as sulphuric acid.

In accordance with our invention the phosphoric acid is rendered soluble by adding the phosphates, in the purification of the heavy metals, to the slag thereby produced, with or without the addition of a base, such as an alkali earth, oxid of iron, oxid of manganese, or alumina, or their equivalent, and the product of the combination, when finely ground and without any chemical treatment whatever, may be utilized directly as a fertilizer or manure.

The combination of the phosphoric acid with the base by the igneous method may be effected in various ways, some of which will now be described.

The phosphates, with or without previous heating or other preparation, and with or without an addition of a base, such as lime, magnesia, or substances rich in either of these, such as basic slag, calcite, or dolomite, or in exceptional cases of oxid of iron, may be added to the Bessemer or open hearth, or puddling or pig-washing process in addition to the usual charge placed therein.

The addition may take place either before, during, or after the conversion of the usual charge therein, and the phosphoric acid is combined with the bases present and converted into a soluble form.

The earthy base added to the charge to be treated may and preferably will be in such quantity as will convert all or substantially all of the insoluble phosphates into tetrabasic phosphates.

When the iron to be treated in the Bessemer or open hearth process contains phosphorus, the phosphoric slag formed is, by our process, enriched with soluble phosphates and becomes more valuable as a fertilizer; or if not enriched, is increased in quantity; or it may be both enriched and increased in quantity.

We will now describe in some detail the application of our process to the basic Bessemer process, believing this to be the best mode of applying our process. In this process the phosphorus initially present in the cast iron is oxidized by the oxygen of the air blown through the molten metal and passes into the slag partially or wholly in the form of tetrabasic phosphate of lime. Moreover, the silicon of the cast iron is also oxidized to silica and passes into the slag to form silicate of iron, or of lime, or both. If the slag contains more than say twenty per cent. of silica the removal of the phosphorus from the cast iron cannot be complete. Hence it is necessary to add enough lime to dilute the silica of the slag (both that incidentally introduced as an impurity of the lime employed, and that arising from the oxidation of the silicon of the cast iron) sufficiently to bring the proportion of silica in the slag below twenty per cent., and if very thorough removal of phosphorus from the metal be sought, it may be necessary to add sufficient lime to reduce the proportion of silica to fifteen per cent., or even less. The lime should be preheated to redness and introduced into the converter before the charge of pig iron. In calculating the addition of lime, we must also provide enough to make the slag at least as basic as tetrabasic phosphate, if we desire to dephosphorize the iron thoroughly; that is to say, we must have present from one source or another enough lime or other alkaline earth not only to neutralize the silica but also to form a phosphate at least as basic as tetrabasic, with the whole of the phosphoric acid present, including that added in the form of natural or other phosphates.

In our process we add, usually along with the lime, a quantity of the natural or other difficultly soluble phosphate which we seek to render more soluble; and this phosphate should preferably be highly preheated, say to moderate redness, but it need not be pulverized or even crushed. The phosphate added should be as free from silica as possible. The molten cast iron is then run into the converter, the blast let on, and the charge converted into steel in usual manner. The lime and the phosphate added gradually combine and melt as the operation progresses and the temperature rises. The phosphoric acid of the phosphate unites with the lime added and with the phosphoric acid formed by the oxidation of the phosphorus of the cast iron to form a basic phosphate, which is removed from the converter toward or at the end of the operation. We prefer to remove it slightly before the end of the operation, because the slag is then comparatively free from iron oxid; but later, as the operation of dephosphorizing the iron, or the "afterblow," draws near its end, iron oxid passes rapidly into the slag, thereby diluting its phosphoric acid and impairing its value as manure. The phosphoric acid thus formed is removed from the converter by inclining the latter just enough to permit the slag to run out into a large ladle or mold placed beneath, and care must be taken not to incline the converter far enough to permit the molten iron, on which the layer of molten slag reposes, to run out along with the slag. To further provide against this, a workman swings an iron rod back and forth across the stream of slag as it runs out of the mouth of the converter, by means of which he can readily detect the presence of any molten metallic iron that may begin to run out with the slag. The slag, when thus removed, should be comminuted as hereinafter described, or otherwise. The slag once removed from the converter, the latter is again turned up and the dephosphorization of the iron completed by continuing to blow air through it. By this means and at trifling cost we are enabled to convert the phosphorus of the difficultly soluble natural phosphates into the readily soluble tetrabasic phosphate of the basic Bessemer slag.

We have thus far described our invention in connection with the Bessemer converter and open hearth process for treating iron, but we do not desire to limit our invention in this respect, as the combination of the phosphoric acid with a base by heat may be effected in the treatment of other metals, such for instance as copper sulfids or other sulfids undergoing desulfurization, or copper matte or crude metallic copper undergoing de-arsenization or other like purification in a reverberatory furnace. In such and like cases the natural or other insoluble phosphates may be charged in the furnace, where it will re-act with the basic slag or other basic material present, and its phosphoric acid will be rendered more soluble. In each of these cases it would be desirable that there should be sufficient base present to make the slag at least as basic as tetrabasic. In several such cases a large amount of iron oxid habitually exists in the slag. In others, as in the de-arsenization of crude metallic copper, which is effected habitually in basic-lined furnaces, a large quantity of lime is necessarily present. If there be not enough base present to render the slag sufficiently basic, then an addition of limestone, or better still of lime, may be made, though some other base, e. g., some other alkaline earth or iron oxid may be substituted for lime. The basic slags obtained in any of these ways may be used advantageously for manure, after comminuting as elsewhere described.

The molten phosphate is preferably finely divided or comminuted as it issues from the furnace, and this may be effected in any desired manner, as for instance by passing it between rollers, by allowing it to fall into a tank or stream of water, or by causing a jet of air, of steam, or of water to impinge upon the stream of molten phosphate, reducing it to a condition resembling the so-called slag-wool, and in which condition it may be advantageously used as a fertilizer.

When we have hereinbefore spoken of phosphates as "soluble," we do not mean to imply that they are readily soluble in water, but that they give up their phosphoric acid with reasonable rapidity to the solvents which exist in the soil. This is the kind of solubility which is needed and valuable in a manure.

We claim—

1. The herein described method of increasing the solubility of phosphates, which consists in adding said phosphates in the purification of the heavy metals, substantially as described.

2. The herein described method of increasing the solubility of phosphates, which consists in adding said phosphates in the dephosphorization of iron, substantially as described.

3. The herein described method of increasing the solubility of phosphates, which consists in adding phosphates, and a base, in the dephosphorization of iron, substantially as described.

4. The herein described method of increasing the solubility of phosphates, which consists in adding phosphates and lime, in the dephosphorization of iron in a converter, substantially as described.

In testimony whereof, we have signed our names to this specification in the presence of two subscribing witnesses.

HENRY M. HOWE.
JOHN EDWARD STEAD.

Witnesses as to the signature of Henry M. Howe:
    JAS. H. CHURCHILL,
    EMMA J. BENNETT.

Witnesses as to the signature of John Edward Stead:
    HENRY FRANKLAND,
    WM. HY. PEARSON.